United States Patent
Chen et al.

(10) Patent No.: US 9,658,667 B2
(45) Date of Patent: May 23, 2017

(54) POWER SUPPLY SYSTEM FOR AN INFORMATION HANDLING SYSTEM

(71) Applicant: International Business Machines Corporation, Armonk, NY (US)

(72) Inventors: Frank Chen, Taipei (TW); George Cheng, New Taipei (TW); Peter Cy Huang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 14/723,495

(22) Filed: May 28, 2015

(65) Prior Publication Data

US 2015/0346789 A1    Dec. 3, 2015

(30) Foreign Application Priority Data

May 29, 2014 (TW) .............................. 103118830 A (51) Int. Cl.
 *G06F 1/26* (2006.01)
(52) U.S. Cl.
 CPC .................................... *G06F 1/263* (2013.01)
(58) Field of Classification Search
 None
 See application file for complete search history.

(56) References Cited

U.S. PATENT DOCUMENTS

| | | | | |
|---|---|---|---|---|
| 5,032,971 A | * | 7/1991 | Yamada | H02M 7/23 363/65 |
| 6,092,207 A | * | 7/2000 | Kolinski | G06F 1/263 713/323 |
| 6,614,133 B2 | * | 9/2003 | Belson | H02J 1/10 307/29 |
| 7,205,681 B2 | * | 4/2007 | Nguyen | H02J 1/10 307/18 |
| 7,966,507 B2 | | 6/2011 | Kanzawa | |
| 8,037,330 B2 | | 10/2011 | Livescu et al. | |
| 9,438,038 B1 | * | 9/2016 | Quaife | H02J 3/14 |
| 2010/0100756 A1 | * | 4/2010 | Rahardjo | G06F 1/28 713/330 |
| 2012/0243160 A1 | | 9/2012 | Nguyen et al. | |
| 2013/0154545 A1 | * | 6/2013 | Wang | H02J 9/06 320/107 |

FOREIGN PATENT DOCUMENTS

| | | |
|---|---|---|
| JP | 2012137887 | 7/2012 |
| TW | 201037969 | 10/2010 |

* cited by examiner

*Primary Examiner* — Nitin Patel
(74) *Attorney, Agent, or Firm* — Lieberman & Brandsdorfer, LLC (57) ABSTRACT

A power supply system is provided to control one or more power supply units associated with an information handling system. A first power supply unit and a second power supply unit are electrically coupled to the information handling system. A controller is provided in communication with both the first and second power supply units. The controller functions to select one of the first and second power supply units to electrically power the information handling system. The non-selected unit generates zero output.

11 Claims, 4 Drawing Sheets

POWER SUPPLY SYSTEM FOR AN INFORMATION HANDLING SYSTEM

CROSS-REFERENCE TO RELATED APPLICATION(S)

This application claims priority under 35 U.S.C. §119 from Taiwan Patent Application No. 103118830, filed on May 29, 2014, the entire contents of which are incorporated by reference herein.

BACKGROUND

Technical Field

The present embodiments generally relate to an information handling system, and in particular, to a power supply system for the information handling system.

Description of the Prior Art

Power supply to a conventional information handling system requires one or more power supply units which are electrically coupled to the information handling system, respectively. The one or more power supply units usually share load equally. For example, in a system with two power supply units, each of the units has a substantially equal load around 50%.

To ensure high reliability of the power supply units, it is necessary that each power supply unit for the information handling system is configured with a specific service life. For example, the total operating time of each power supply unit is set to a maximum of five years. However, operating multiple power supply units simultaneously to share a load equally puts a limit on the service life of each power supply unit, thereby aggravating the aging of each component in operation. As a result, operating multiple power supply units simultaneously imposes enormous restraints on the operation of the power supply units for the information handling system.

If multiple power supply units operate simultaneously in a high-temperature heavy-load environment for a long period of time, the components of each power supply unit will undergo aging simultaneously and intensely, and in consequence the reliability of the power supply units will decrease greatly.

SUMMARY

The aspects described herein comprise a power supply system and a computer program product for controlling one or more power supply units associated with an information handling system.

According to one aspect, a system is provided to control one or more power supply units associated with an information handling system. A first power supply unit and a second power supply unit are electrically coupled to the information handling system. A controller is provided in communication with both the first and second power supply units. The controller functions to select one of the first and second power supply units to electrically power the information handling system. The non-selected unit generates zero output.

According to another aspect, a computer program product having computer program code is provided to be loaded and executed on an information handling system. The program code selects one of a first power supply unit and a second power supply unit to electrically power the information handling system. The program code controls power delivery so that the selected power supply unit outputs power for the information handling system, and the non-selected unit generates zero output.

The following description, the appended claims, and the embodiments further illustrate the features and advantages.

BRIEF DESCRIPTION OF THE DRAWINGS

In order for the advantages of the embodiments to be readily understood, a more particular description of the embodiments briefly described above will be rendered by reference to specific embodiments that are illustrated in the appended drawings. Understanding that these drawings depict only typical embodiments and are not therefore to be considered to be limiting of its scope, the embodiments will be described and explained with additional specificity and detail through the use of the accompanying drawings.

DETAILED DESCRIPTION OF THE EMBODIMENTS

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all of the embodiments.

As will be appreciated by one skilled in the art, the embodiments may be embodied as a system, a method or a computer program product. Accordingly, the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages.

The embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIGS. 1-4 depict flowchart(s) and block diagram(s) of a practical architecture, functions and operations of a system, a method and a computer program product according to embodiments described below. Each block in the flowchart or block diagram may represent a module, a segment or a part of a program code, and may include one or more executable instructions to perform a designated logic function. It should be noted that, in other embodiments, the functions depicted by the blocks may be performed in a sequence other than that shown in the figures. For example, two connected blocks in each figure may both be performed, or, with certain functions involved or under certain circumstances, may be performed in a reverse sequence of the sequence shown in each figure. It should be also noted that, each block in each block diagram and/or each flowchart, and combinations of the blocks in each block diagram and/or each flowchart, may be implemented on the basis of a hardware system for a specific purpose or perform specific functions or operations by means of the combination of hardware and computer instructions for a specific purpose.

Figure 1:
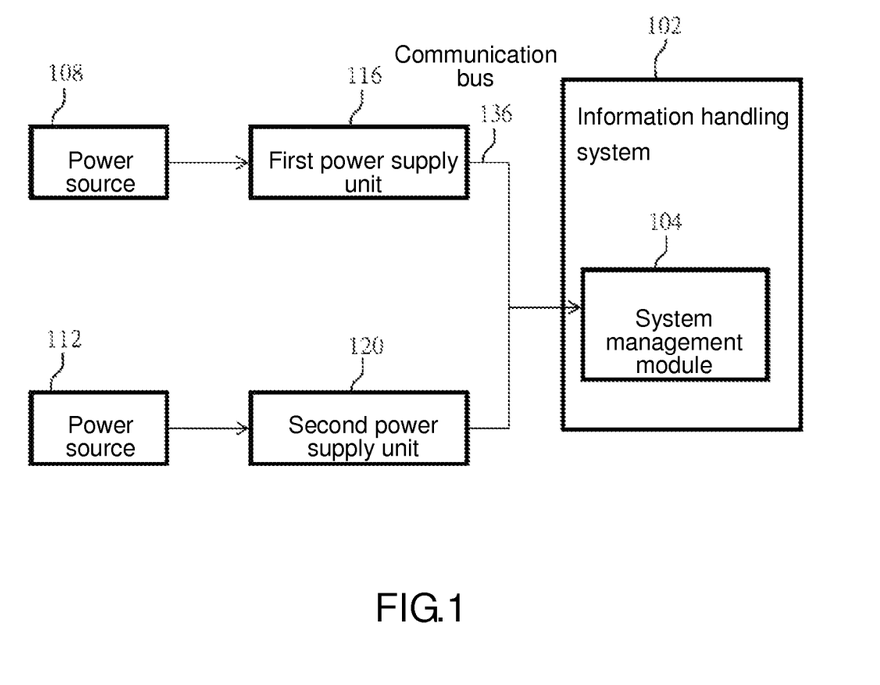
FIG. 1 depicts a function module diagram of a power supply system for an information handling system.

Referring to FIG. 1, there is shown a block diagram of a power supply system for an information handling system (102) according to a preferred embodiment. The information handling system (102) comprises a central processing unit (CPU) (not shown) and a system management module (104). The information handling system (102) is electrically coupled to at least two power supply units (PSUs). The two power supply units are DC power supply units, or AC power supply units, or are composed of a DC power supply unit and an AC power supply unit. The power supply units are attributed to common knowledge available to persons skilled in the art and thus are not described in detail herein for the sake of brevity. The power supply system for the information handling system comprises a plurality of power supply units. In one embodiment, the power supply system comprises two power supply units (116) and (120) and is supplied with power from power sources (108) and (112). The power supply system for the information handling system (102) comprises a first power supply unit (116) and a second power supply unit (120). The first power supply unit (116) is electrically coupled to the information handling system (102) and the power source (108). The second power supply unit (120) is electrically coupled to the information handling system (102) and the power source (112).

In response to the power supply system beginning to electrically power the information handling system (102), one of the first power supply unit (116) and the second power supply unit (120) is controlled to electrically power the information handling system (102), and the other of the first power supply unit (116) and the second power supply unit (120) is controlled not to electrically power the information handling system (102). In one embodiment, the operation of the power supply system does not require all the power supply units to generate power simultaneously but allows one of the power supply units to be in a zero-output mode. The power supply unit which is in the zero-output mode stops operating on a secondary end to thereby save power. In one embodiment, the power supply system comprises a controller for controlling one of the first power supply unit (116) and the second power supply unit (120) to electrically power the information handling system and the other of the first power supply unit (116) and the second power supply unit (120) to generate zero output in response to the power supply system electrically powering the information handling system. In a preferred embodiment, the system management module (104) of the information handling system (102) is adapted to obtain a total ON duration of the first power supply unit (116) and a total ON duration of the second power supply unit (120). The power supply unit in the zero-output mode and the power supply unit not in the zero-output mode can be switched as needed to therefore extend the service life of the power supply system for the information handling system by comparing the total ON duration of the first power supply unit (116) and the total ON duration of the second power supply unit (120) to obtain a total ON duration difference, and then switching, in response to the total ON duration difference exceeding a predetermined threshold, to the power supply unit with the shorter total ON duration to electrically power the information handling system (102).

In another preferred embodiment, a first power supply unit microcontroller (microprocessor control unit) (204) (see FIG. 2) of the first power supply unit (116) and a second power supply unit microcontroller (224) (see FIG. 2) of the second power supply unit (120) communicate with each other through a communication bus (136). Both the first power supply unit microcontroller (204) and the second power supply unit microcontroller (224) perform the followings steps of: obtaining a total ON duration of the first power supply unit (116) and a total ON duration of the second power supply unit (120), comparing the total ON duration of the first power supply unit (116) and the total ON duration of the second power supply unit (120) to obtain a total ON duration difference, and switching, in response to the total ON duration difference exceeding a predetermined threshold, to the power supply unit with the shorter total ON duration to electrically power the information handling system (102).

Examples of the information handling system (102) include, for example, a server unit, an information processor unit, an exchanger unit, a router unit, a network apparatus unit, or any other computer component unit, and is not limited thereto. For instance, for the basic framework and components of the server unit, refer to typical personal computers and servers, such as IBM's System X, Blade Center, and eServer server. Details not related to the present embodiments are omitted herein.

The power source (108) and the power source (112) are either identical or different. For instance, the power supplied by the power source (108) and the power source (112) may originate from a public power grid, an uninterruptible power supply (UPS) system, or a battery, and is not limited thereto. When the first power supply unit (116) and the second power supply unit (120) are AC power supply units, the external AC voltage is converted into the DC voltage. In another aspect, when the first power supply unit (116) and the second power supply unit (120) are DC power supply units, the external DC voltage is converted into the DC voltage for use by the system later.

In a preferred embodiment, the system management module (104) is typically a microcontroller module operated by a monitoring system and comprises a microcontroller and a memory (not shown). The central processing unit (CPU), the system management module (104), and the like are mounted on a motherboard (not shown). The system management module (104) is preferably an integrate management module (IMM), a baseboard management controller (BMC), a node manager, an embedded controller (EC), or a management engine (ME) on the motherboard of the information handling system (102), and is not limited thereto. For further information about the system management module (104), refer to Renesas' H8S/2117, Altera's EP4CE15F, or Microchip's DSPIC30F, or US 20110320826 filed by the Applicant of this patent application, for the purpose of further amendment and extension.

Take the IMM as an example, its firmware complies with the Intelligent Platform Management Interface (IPMI) standards in order to perform system monitoring. In fact, given IPMI 2.0 compliance and Serial over LAN (SOL), the IMM provides system management functions, serves as a general-purpose management interface for supporting inter-product combinations, effectuates server monitoring and testing, alert, and remote control, and achieves complete system management support. The IPMI standards are attributed to common knowledge available to persons skilled in the art and thus are not described in detail herein for the sake of brevity. For further information about IPMI standards, such as IPMI 2.0, visit http://www.intel.com/design/servers/ipmi/

Figure 2:
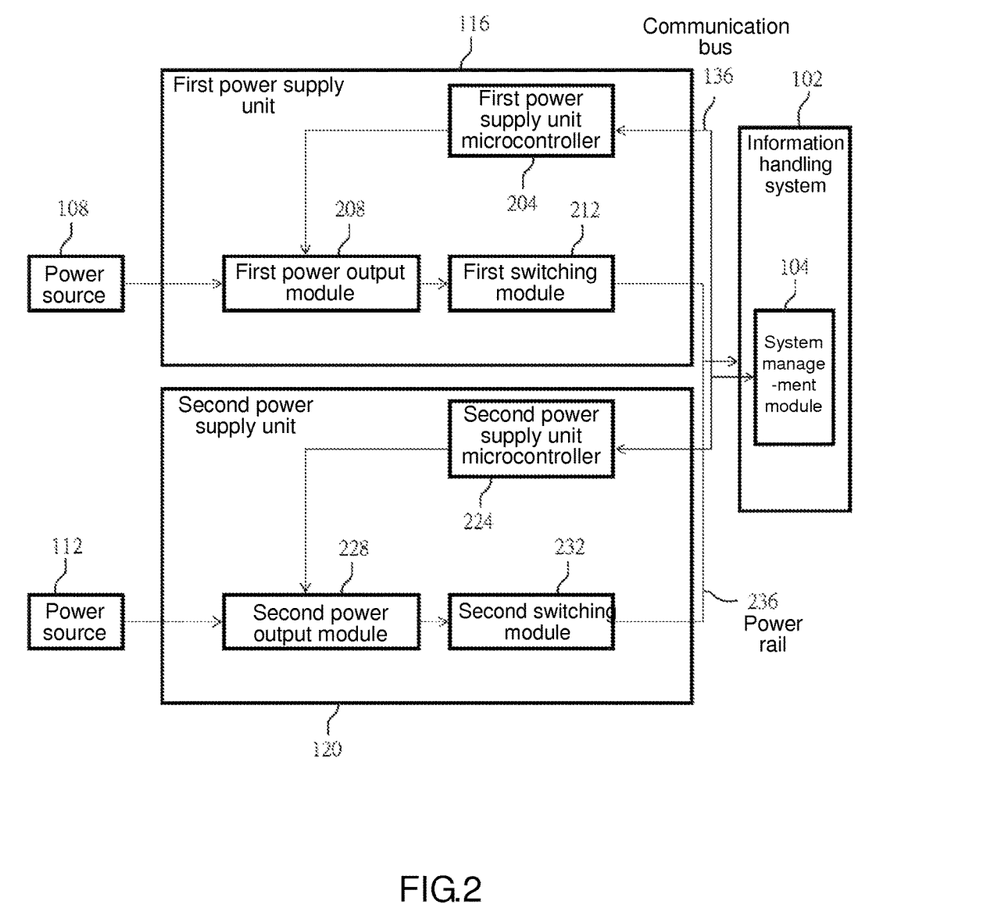
FIG. 2 depicts a structural schematic view of a power supply system for an information handling system.

In another aspect, for further information about the first power supply unit microcontroller (204) of the first power supply unit (116) and/or the second power supply unit microcontroller (224) of the second power supply unit (120), refer to Renesas' H8S/2117, Altera's EP4CE15F, or Microchip's DSPIC30F, or US 20110320826 filed by the Applicant of this patent application, for the purpose of further amendment and extension.

The system management module (104) is electrically coupled to the first power supply unit microcontroller (204) and the second power supply unit microcontroller (224) through the communication bus (136). The communication bus (136) enables the communication between the system management module (104) (such as an IMM), the first power supply unit microcontroller (204), and the second power supply unit microcontroller (224). The communication bus (136) operates by various protocols, such as PMBUS or SMBUS, but the present embodiment is not limited thereto. Take the protocol for use with I2C (PMBUS) as an example, signals which alternates between 0 and 1 are generated on a bus by a serial clock line (SCL) and a serial data line (SDA), and then the signals are sent through the communication bus (136) to the first power supply unit microcontroller (204) and the second power supply unit microcontroller (224) to effectuate bidirectional communication. Data transmitted by a protocol is converted into a related command.

As mentioned before, at least one of the power supply units is configured to be in the zero-output mode. Hence, while the other power supply unit is sufficiently supplying electrical power, the at least one power supply unit stays in the zero-output mode and thus generates a power substantially equal to 0 W. In an embodiment exemplified by two power supply units, while the first power supply unit (116) is sufficiently supplying electrical power, the second power supply unit (120) is in the zero-output mode, but the second power supply unit (120) begins to supply electrical power and the first power supply unit (116) enters the zero-output mode as soon as a power supply switching criterion is met, and vice versa.

Referring to FIG. 2, there is shown a structural schematic view of the information handling system (102), the first power supply unit (116), and the second power supply unit (120) in the embodiment illustrated with FIG. 2. The first power supply unit (116) comprises the first power supply unit microcontroller (204), a first power output module (208), and a first switching module (212). The first power supply unit microcontroller (204) receives signals from the system management module (104) to effectuate bidirectional communication. Typically, the system management module (104) uses respective interfaces to manage the information handling system (102), and the management includes but is not limited to power management, system status detection, system recovery control, event screening, and event log. The system management module (104) has one or more signal ports for sending a control signal to the first power supply unit (116) and the second power supply unit (120) to control the operation or configuration thereof. The first power supply unit microcontroller (204) is electrically coupled to the first power output module (208). The first power output module (208) receives a control signal from the first power supply unit microcontroller (204) to operate the first power output module (208) for supplying output electrical power. The first power output module (208) is electrically coupled to the first switching module (212). The first switching module (212) can be embodied in the form of a diode which receives an input data (control signal) from the first power output module (208) to perform the determination of an open circuit or a broken circuit and thus effectuate electrical power output or zero output.

The second power supply unit (120) comprises the second power supply unit microcontroller (224), a second power output module (228), and a second switching module (232). The second power supply unit microcontroller (224) receives signals from the system management module (104) to effectuate bidirectional communication. The system management module (104) has one or more signal ports for sending a control signal to the first power supply unit (116) and the second power supply unit (120) to control the operation or configuration thereof. The second power supply unit microcontroller (224) is electrically coupled to the second power output module (228). The second power output module (228) receives a control signal from the second power supply unit microcontroller (224) to operate the power output module (228) for providing electrical power output. The second power output module (228) is electrically coupled to the second switching module (232). The second switching module (232) can be embodied in the form of a diode which receives an input data (control signal) from the second power output module (228) to perform the determination of an open circuit or a broken circuit and thus effectuate electrical power output or zero output. In another aspect, the first switching module (212) and the second switching module (232) are electrically coupled to the information handling system (102) through a power rail (236), for example, but is not limited thereto.

The first power output module (208) and the second power output module (228) may be pulse width modulator (PWM) controllers or pulse frequency modulator (PFM) controllers, but is not limited thereto, for controlling the DC output and level of the power output modules according to a control signal. In short, if the first power output module (208) (or the second power output module (228)) is operating and the first switching module (212) (or the second switching module (232)) is operating, it means that electrical power is supplied to the information handling system (102).

Due to communication between the system management module (104), including but not limited to an IMM, the first power supply unit microcontroller (204), and the second power supply unit microcontroller (224), it is practicable to configure one of the first power supply unit (116) and the second power supply unit (120) to serve as the main power supply for the information handling system (102) and configure the other one to serve as a standby power supply which operates in a standby mode and does not output any power in the course of operation of the system management module (104) of the information handling system (102). From the perspective of the information handling system (102), the power supply unit which does not output any power is defined as operating in a zero-output mode. Hence, the second power supply unit (120) is in the zero-output mode while the first power supply unit (116) is sufficiently supplying electrical power, whereas the first power supply unit (116) is in the zero-output mode while the second power supply unit (120) is sufficiently supplying electrical power.

Figure 3:
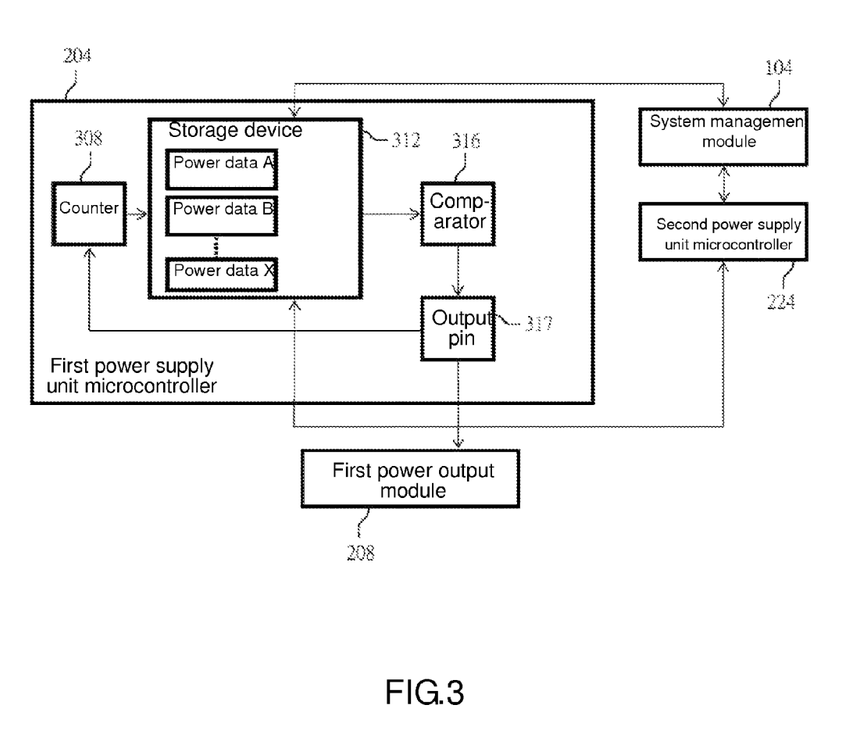
FIG. 3 depicts a structural schematic view of a first power supply unit microcontroller and related components.

Referring to FIG. 3, there is shown a structural schematic view of the first power supply unit microcontroller (204) and related components according to a preferred embodiment. The first power supply unit microcontroller (204) comprises a counter (308), a storage device (312), a comparator (316), and an output pin (317). The counter (308) is electrically coupled to the storage device (312). The storage device (312) is electrically coupled to the comparator (316), the system management module (104), and the second power supply unit microcontroller (224). The comparator (316) is electrically coupled to the output pin (317) to compare the ON durations of the first and second power supply units (116), (120) and sends the ON duration difference. Examples of the storage device (312) include, but are not limited to, a register and cache memory. Take the register as an example, various power data, namely power data$_A$, power data$_B$, . . . , power data$_X$, are stored at different addresses of the register, respectively. The various power data include the total ON duration of the first power supply unit (116), the total ON duration of the second power supply unit (120), voltage data, current data, power data, and product data. Transfer of data between the register (312) and the system management module (104) is bidirectional. Given (1) firmware built in the first power supply unit microcontroller (204) and the second power supply unit microcontroller (224) and/or (2) firmware built in the system management module (104) and adapted to execute an algorithm and operation, it is feasible to store the total ON duration of the first power supply unit (116) and the total ON duration of the second power supply unit (120) in the register (312), to compare the total ON duration of the first power supply unit (116) and the total ON duration of the second power supply unit (120) to obtain a total ON duration difference, and to switch the power supply unit with the shorter total ON duration to supply electrical power when the total ON duration difference exceeds a predetermined threshold. Although the structure of the first power supply unit microcontroller (204) is illustrated schematically with the diagram, equivalent and similar structures of the second power supply unit microcontroller (224) can be inferred by persons skilled in the art and thus are not described in detail herein for the sake of brevity.

The first power supply unit microcontroller (204) and the second power supply unit microcontroller (224), and the system management module (104) each comprise a microcontroller and a memory by which the aforesaid firmware is implemented. The memory includes but is not limited to a nonvolatile memory, such as a flash ROM, or an EEPROM. The nonvolatile memory comprises a protected area and a flashable area. The protected area stores therein indelible code, including but not limited to additional function data and firmware for executing an algorithm. The flashable area stores therein, for example, a fan rotation speed parameter, a workplace temperature parameter and related parameters, or the other parameters pertaining to power control.

The counter (308) generates a clock signal for obtaining the ON duration of the first power supply unit (116). The counter (308) includes but is not limited to a crystal oscillator. The output pin (317) is, for example, implemented in the form of a DSPIC30F general-purpose output (GPO) pin, and the aforesaid comparison result is sent by the general-purpose output pin (under the control of the power supply unit microcontroller) to the first power output module (208) and the counter (308) so as to control the power supply management of the information handling system (102). The output pin (317) is electrically coupled to the counter (308) to enable the counter (308) to count. The output pin (317) is electrically coupled to the first power output module (208)

to enable the voltage level of the power output module. The components of the first power supply unit microcontroller (204) are each a conventional one. In another aspect, the second power supply unit microcontroller (224) is similar to the first power supply unit microcontroller (204) in terms of constituent components, firmware, and thus functions; hence, the second power supply unit microcontroller (224) is not described in detail herein for the sake of brevity.

In a preferred embodiment, the system management module (104) polls the first power supply unit microcontroller (204) and the second power supply unit microcontroller (224) regularly to monitor the present power supply status of the information handling system (102), to record the total ON duration of each power supply unit, and to compare the total ON durations of the power supply units, and eventually takes appropriate measures for managing the power supply units.

In another preferred embodiment, the first power supply unit microcontroller (204) and the second power supply unit microcontroller (224) communicate with each other through the communication bus (136). Under the operation of the firmware of the first power supply unit microcontroller (204) and/or the operation of the firmware of the second power supply unit microcontroller (224), the first power supply unit microcontroller (204) and the second power supply unit microcontroller (224) mutually play master and slave roles for sending instructions of periodically polling in order to record the total ON duration of each power supply unit, to compare the total ON durations of the power supply units, and to eventually take appropriate measures for managing the power supply units.

In the aforesaid two preferred embodiments, selection of a power source carried out by the system management module (104) or by the master/slave operation of the first power supply unit microcontroller (204) and the second power supply unit microcontroller (224) can be achieved by hardware. Take the first power supply unit microcontroller (204) as an example, an OR gate (not shown) receives a signal from the system management module (104) and a signal from the second power supply unit microcontroller (224) and then sends the signals to the comparator (316). The system management module (104) and the second power supply unit microcontroller (224) are connected through the communication bus (136) (such as PM Bus). Given the hardware, the first power supply unit microcontroller (204) and the second power supply unit microcontroller (224) communicate with each other, execute commands, and choose the right one to perform load time balance management of the first power supply unit (116) and the second power supply unit (120). Alternatively, the aforesaid selection is achieved by firmware which can be easily inferred by persons skilled in the art and thus are not described in detail herein for the sake of brevity.

When one of the first power supply unit (116) and the second power supply unit (120) is configured to be the main power supply for the information handling system (102), the other one becomes a standby power supply and enters the zero-output mode to therefore generate a power substantially equal to 0 W. Hence, the power supply system shown in FIG. 2 features low net power consumption and thus is highly energy-efficient. If one of the two power supply units fails to supply electrical power, the other power supply unit will begin to supply electrical power immediately to thereby supply standby power.

Referring to FIG. 2 and FIG. 3, the first switching module (such as a diode) (212) and the second switching module (such as a diode) (232) are electrically coupled to the information handling system (102) to control the electrical power supply to the information handling system (102). When the input end of the first switching module (212) (or the second switching module (232)) is of a high-level potential, the first switching module (212) (or the second switching module (232)) is ON, and thus the first power supply unit (116) (or the second power supply unit (120)) is defined to be ON. The counter (308) (or the counter of the second power supply unit microcontroller (224)) begins to count and thus calculates the ON duration of the first power supply unit (116) (or the second power supply unit (120)) and calculates the total ON duration of the first power supply unit (116) (or the second power supply unit (120)) by adding up previous ON durations. In another aspect, when the input end of the first switching module (212) (or the second switching module (232)) is of a low-level potential, the first switching module (212) (or the second switching module (232)) is OFF, and thus the first power supply unit (116) (or the second power supply unit (120)) is defined to be OFF. The counter (308) (or the counter of the second power supply unit microcontroller (224)) stops counting and thus keeps the initial total ON duration.

As mentioned before, given hardware or related firmware, the power supply units can be controlled by the system management module (104) or the first power supply unit microcontroller (204) and the second power supply unit microcontroller (224). The system management module (104), the first power supply unit microcontroller (204), and the second power supply unit microcontroller (224) are connected to each other through the communication bus (136). Regarding data (inclusive of a header formatted in a manner to have an I2C-specific format, for example) transmitted by means of a protocol, the data field specifies that the system management module (104) or the second power supply unit microcontroller (224) is identified to perform power source control. For example, the aforesaid technique entails determining which of the system management module (104) and the second power supply unit microcontroller (224) exercises control over the power supply units according to a user's preference. In another aspect, by means of a similar technique, power source control is exercised with the system management module (104) or the first power supply unit microcontroller (204), so as to switch between the first power supply unit (116) and the second power supply unit (120). Data transmitted by means of a protocol and its format are attributed to the prior art and thus well-known among persons skilled in the art.

In general, in a preferred embodiment, the system management module (104) of the information handling system (102) obtains a total ON duration of the first power supply unit (116) and a total ON duration of the second power supply unit (120) to therefore manage power supply of the first power supply unit (116) and the second power supply unit (120).

In another preferred embodiment, the first power supply unit microcontroller (204) and the second power supply unit microcontroller (224) communicate with each other and obtain a total ON duration of the first power supply unit (116) and a total ON duration of the second power supply unit (120), and then the first power supply unit microcontroller (204) and the second power supply unit microcontroller (224) cooperate to manage the power supply of the first power supply unit (116) and the second power supply unit (120). In this preferred embodiment, the first power supply unit microcontroller (204) and/or the second power supply unit microcontroller (224) perform power supply management. The first power supply unit microcontroller (204) and the second power supply unit microcontroller (224) are coupled to the power output modules (208), (228) through an I/O port (general-purpose output, GPO) to send a signal for controlling the output from a voltage controller (not shown) of the power output modules (208), (228). The I/O port can be embodied in the form of either a general-purpose output (GPO) transfer interface typical of conventional FPGA or a specific port. The general-purpose output transfer interface is flexible and permits various customized ways of coupling. The system management module (104) functions as a monitoring chip and shares the total ON durations of the first power supply unit (116) and the second power supply unit (120) which can be used in comparing the total ON durations and reporting related information to a graphical user interface (GUI, not shown).

Figure 4:
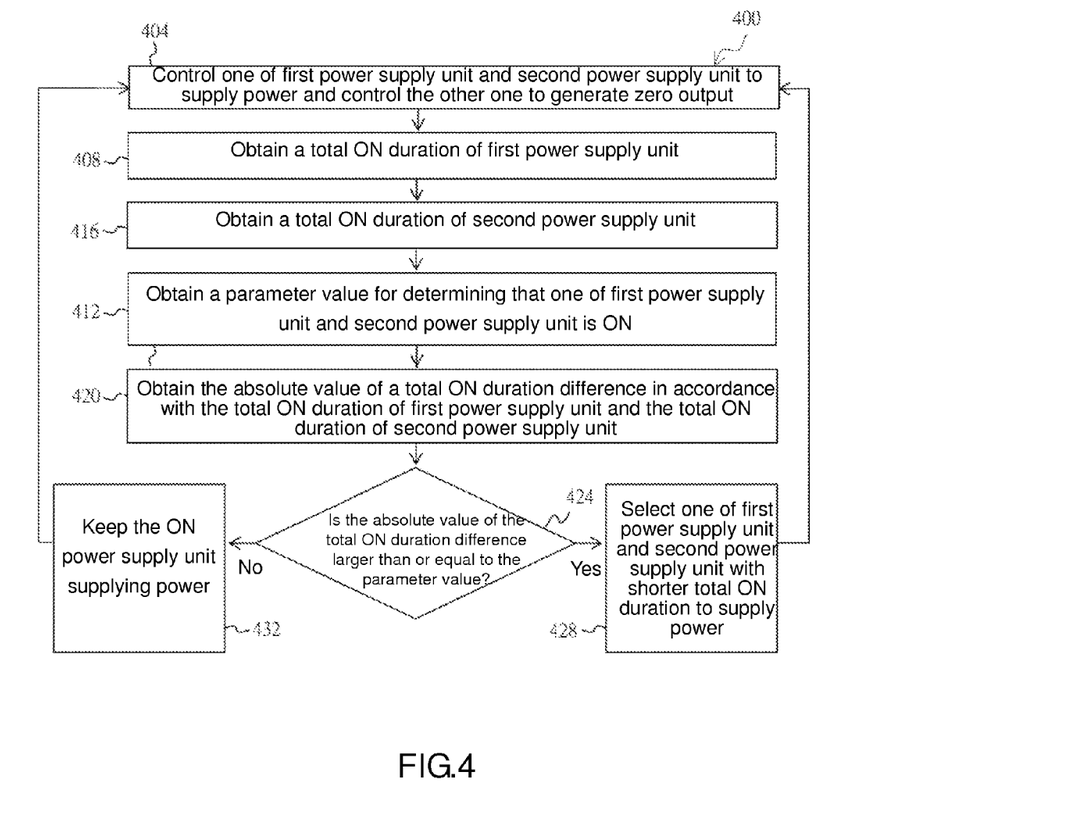
FIG. 4 is a flow chart of a power supply control method.

Referring to FIG. 4, there is shown a flow chart of a power supply control method (400) carried out with the hardware framework illustrated with FIG. 1, FIG. 2, and FIG. 3 according to an embodiment.

Step (404): in response to the power supply system beginning to electrically power the information handling system (102), one of the first power supply unit (116) and the second power supply unit (120) is controlled to supply electrical power (i.e., be ON), and the other one of the first power supply unit (116) and the second power supply unit (120) is controlled to generate zero output (i.e., be OFF). As described above, the control is effectuated in either of the two following ways: (1) the system management module (104) and (2) the first power supply unit microcontroller (204) and/or the second power supply unit microcontroller (224).

Step (408): obtain a total ON duration of the first power supply unit (116). In a preferred embodiment, through the communication bus (136), the first power supply unit microcontroller (204) of the power supply unit (116) provides the system management module (104) of the information handling system (102) with the total ON duration of the first power supply unit (116). In this preferred embodiment, step (408) precedes step (412). In a variant embodiment, step (408) follows step (412).

Step (412): obtain a total ON duration of the second power supply unit (120). In a preferred embodiment, through the communication bus (136), the second power supply unit microcontroller (224) of the second power supply unit (120) provides the total ON duration of the second power supply unit (120) to a register of the system management module (104) of the information handling system (102). The system management module (104) polls a register of the first power supply unit microcontroller (204) of the first power supply unit (116) and a register of the second power supply unit microcontroller (224) of the second power supply unit (120) to therefore obtain the total ON duration of the first power supply unit (116), the total ON duration of the second power supply unit (120), and the difference therebetween (see step (420)). Take an IMM as an example, the IMM polls the first power supply unit microcontroller (204) and the second power supply unit microcontroller (224) regularly to monitor total ON durations of the first and second power supply units (116) and (120), to record the total ON durations timely, and to perform power supply unit switching steps accordingly (see step (428)). The IMM is a standalone computation and control unit and is built in with firmware for driving an algorithm and operation shown in FIG. 4. Conventional registers for use in the first power supply unit microcontroller (204) and the second power supply unit microcontroller (224) are 16-bit and 32-bit registers, and the registers have numerous addresses for storing various data temporarily as needed. The intervals at which the system management module (104) polls are subject to changes as needed and include but are not limited to a frequency larger than 400K. However, in general, the more often the polls proceed, the more accurate the time of achieving load balance is. In this preferred embodiment, each interval between the polls is configured to a minute, but is not limited thereto. In another preferred embodiment, the first power supply unit microcontroller (204) of the first power supply unit (116) and the second power supply unit microcontroller (224) of the second power supply unit (120) communicate with each other through the communication bus (136). By means of the firmware of the first power supply unit microcontroller (204) performing the method (400) and the firmware of the second power supply unit microcontroller (224) performing the method (400), the first power supply unit microcontroller (204) and/or the second power supply unit microcontroller (224) can obtain the total ON duration of the first power supply unit (116) and the total ON duration of the second power supply unit (120). In this preferred embodiment, the intervals at which the first power supply unit microcontroller (204) of the first power supply unit (116) and/or the second power supply unit microcontroller (224) of the second power supply unit (120) poll are subject to changes as needed and include but are not limited to a frequency larger than 400K. The first power supply unit microcontroller (204) (or the second power supply unit microcontroller (224)) comprises a register (not shown) for recording its total ON duration, thereby facilitating subsequent transmission, comparison, and subtraction.

Step (416): obtain a parameter value (i.e., a predetermined threshold) N for use in determining that one of the first power supply unit (116) and the second power supply unit (120) is ON. In a preferred embodiment, the parameter value N is set to one year or two years, but is not limited thereto.

Step (420): obtain the absolute value of a total ON duration difference in accordance with the total ON duration of the first power supply unit (116) and the total ON duration of the second power supply unit (120).

Step (424): determine whether the absolute value of the total ON duration difference is larger than or equal to the parameter value. Go to step (428) when the determination is affirmative, and go to step (432) when the determination is negative. In a preferred embodiment, T1 denotes the total ON duration of the first power supply unit (116), and T2 denotes the total ON duration of the second power supply unit (120). Go to step (428) when $|T1-T2| \geq N$, and go to step (432) when $|T1-T2| < N$.

Step (428): select the one of the first power supply unit (116) and the second power supply unit (120) having the shorter total ON duration to be supplying electrical power (i.e., ON) if the absolute value of the total ON duration difference exceeds the parameter value, and then go to step (404). Afterward, the method (400) repeats so as to begin to poll anew. Hence, the power supply unit switched to be OFF enters the zero-output mode. Upon completion of the aforesaid step, which of the two power supply units is to be ON is determined. Regarding the power supply unit which is to be ON, the first power supply unit microcontroller (204) (or the second power supply unit microcontroller (224)) sends a control signal to the first power output module (208) (or the second power output module (228)) to further control the first switching module (212) (or the second switching module (232)) so as to render the first power supply unit (116) (or the second power supply unit (120)) ON. In an embodiment, to switch the first power supply unit (116) to be ON and switch the second power supply unit (120) to be OFF, it is necessary for the aforesaid control signal to control the output of the first power output module (208) to be HIGH such that a diode of the first switching module (212) is ON in order for the first power supply unit (116) to be ON, and it is necessary for the aforesaid control signal to control the output of the second power output module (228) to be LOW such that a diode of the second switching module (232) is OFF in order for the second power supply unit (120) to be OFF.

Step (432): keep the ON power supply unit supplying electrical power (i.e., ON) if the absolute value of the total ON duration difference does not exceed the parameter value, and then go to step (404). Afterward, the method (400) repeats so as to begin to poll anew. As shown in flow chart, only one of the first power supply unit (116) and the second power supply unit (120) is ON in each step.

In general, the guaranteed service life (i.e., total ON duration) of a power supply unit never exceeds five years. In a high-temperature heavy-load situation, components in use age more than components not in use. According to the load balance of the present embodiment, not all the power supply units is in use and output power simultaneously. In a light-load situation, the operating power supply unit supplies power when the standby power supply unit is in the zero-output mode.

The embodiment illustrated with FIG. 1 through FIG. 3 is exemplified by the information handling system (102) having two power supply units (116), (120), but persons skilled in the art can easily infer more situations and surroundings, including three, as opposed to two, power supply units, wherein one of the three power supply units is ON, and the other power supply units are standby and thus in the zero-output mode. In a preferred embodiment, the total ON duration of each power supply unit is sent to a system management module (IMM), and the system management module compares the total ON durations of the power supply units two by two. After all the total ON durations of the power supply units have been compared, the power supply unit with the shorter total ON duration is switched to electrically power the information handling system if the total ON duration difference exceeds a predetermined threshold. In another preferred embodiment, the register of the power supply unit microcontroller of each power supply unit stores the total ON durations of the other power supply units, such that the total ON durations of the power supply units are compared two by two. Upon completion of the comparison, the power supply unit with the shorter total ON duration is switched to electrically power the information handling system if the total ON duration difference exceeds a predetermined threshold, but is not limited thereto.

The foregoing detailed description is used to further clearly describe the features and spirit of the embodiments. The foregoing description for each embodiment is not intended to limit the scope. All kinds of modifications made to the foregoing embodiments and equivalent arrangements should fall within the protected scope. Hence, the scope should be explained most widely according to the claims described thereafter in connection with the detailed description, and should cover all the possibly equivalent variations and equivalent arrangements.

What is claimed is:

1. A power supply system adapted for an information handling system and electrically powered by a power source, comprising:
    a first power supply unit and a second power supply unit electrically coupled to the information handling system; and
    a controller for electrically powering the information handling system by selecting one of the first and second power supply units to output power for the information handling system;
    wherein selecting one of the first and second power supply units to output power by the controller comprises:
        the controller obtaining a total ON duration of the first power supply unit and a total ON duration of the second power supply unit, and comparing the total ON duration of the first power supply unit to the total ON duration of the second power supply unit; and
        the controller calculating a total ON duration difference of the first power supply unit and the second power supply unit; and
        the controller selecting a power supply unit having a shorter total ON duration in response to the calculated difference exceeding a threshold; and
    wherein a non-selected power supply unit generates zero power output.

2. The power supply system of claim 1, wherein the non-selected power supply unit generating zero output is OFF and in a standby status.

3. The power supply system of claim 1, further comprising keeping a previously ON power supply unit ON in response to the calculated difference being less than the threshold.

4. The power supply system of claim 1, wherein the controller comprises a system management module to select the one of the first and second power supply units to output power, and wherein the system management module is electrically coupled to the first and second power supply units through a communication bus.

5. The power supply system of claim 4, wherein first and second power supply units comprise respective first and second microcontrollers, and wherein the first and second microcontrollers are electrically coupled through a communication bus.

6. The power supply system of claim 5, wherein the system management module is electrically coupled to the first and second microcontrollers through the communication bus, and wherein the system management module has one or more signal ports to send a control signal to the first and second microcontrollers to select the one of the first and second power supply units to output power.

7. The power supply system of claim 5, wherein the first microcontroller comprises a first counter to obtain the total ON duration of the first power supply unit, and the second microcontroller comprises a second counter to obtain the total ON duration of the second power supply unit, wherein the first power supply unit comprises a first power output module to output a first power, and the second power supply unit comprises a second power output module to output a second power.

8. The power supply system of claim 7, wherein the first microcontroller comprises:
    a storage device electrically coupled to the first counter, the system management module, and the second microcontroller, wherein the storage device stores the total ON duration of the first power supply unit and the total ON duration of the second power supply unit;
    a comparator electrically coupled to the storage device, wherein the comparator compares the ON durations of the first and second power supply units; and an output pin electrically coupled to the comparator, the first counter, and the first power output module, wherein the output pin controls an output level of the first power output module.

9. The power supply system of claim 8, further comprising executing an algorithm to select the one of the first and second power supply units, wherein the algorithm is executed by a device selected from the group consisting of: the first microcontroller, the second microcontroller, the system management module, and any combination thereof.

10. A computer program product adapted for an information handling system and electrically powered by a power source, the computer program product comprising a computer-readable storage device having computer readable program code embodied thereon, which when executed causes a computer to implement a method comprising:
   selecting one of a first power supply unit and a second power supply unit, the selection comprising:
      obtaining a total ON duration of the first power supply unit and a total ON duration of the second power supply unit;
      comparing the total ON duration of the first power supply unit to the total ON duration of the second power supply unit;
      calculating a total ON duration difference of the first power supply unit and the second power supply unit; and
      selecting a power supply unit having a shorter total ON duration in response to the calculated difference exceeding a threshold; and
   outputting, by the selected power supply unit, power for the information handling system;
   wherein the second power supply unit generates zero power output in response to the controller selecting the first power supply unit; and
   wherein the first power supply unit generates zero power output in response to the controller selecting the second power supply unit.

11. The computer program product of claim 10, wherein selecting comprises sending, by the information handling system, a control signal to the selected power supply unit.

* * * * *